United States Patent
Savla

(10) Patent No.: US 8,511,464 B1
(45) Date of Patent: Aug. 20, 2013

(54) BAGS PARTIALLY FILLED WITH STIMULI-RESPONSIVE HIGHLY ABSORBENT SUPERABSORBENT POLYMERS FOR WATER MANAGEMENT AND REPLACEMENT OF DAMS AND CANALS

(76) Inventor: Manilal J. Savla, Manalapan, NJ (US)

( * ) Notice: Subject to any disclaimer, the term of this patent is extended or adjusted under 35 U.S.C. 154(b) by 0 days.

(21) Appl. No.: 13/527,689

(22) Filed: Jun. 20, 2012

Related U.S. Application Data

(63) Continuation-in-part of application No. 13/231,664, filed on Sep. 13, 2011, now abandoned.

(60) Provisional application No. 61/403,737, filed on Sep. 21, 2010.

(51) Int. Cl.
*B65D 81/26* (2006.01)
*B65D 81/22* (2006.01)

(52) U.S. Cl.
USPC ........... 206/204; 525/329.4; 525/55; 528/362

(58) Field of Classification Search
USPC ..................... 525/329.4, 55; 528/362, 329.7; 206/204
See application file for complete search history.

(56) References Cited

U.S. PATENT DOCUMENTS

| | | | | |
|---|---|---|---|---|
| 4,588,505 | A * | 5/1986 | Walley et al. | 210/502.1 |
| 4,615,923 | A * | 10/1986 | Marx | 428/34.3 |
| 6,623,645 | B1 * | 9/2003 | Roach et al. | 210/691 |
| 6,869,464 | B2 * | 3/2005 | Klemic | 95/117 |
| 2003/0035689 | A1 * | 2/2003 | Metz | 405/19 |
| 2011/0118114 | A1 * | 5/2011 | Riegel et al. | 502/401 |

* cited by examiner

*Primary Examiner* — Robert C Boyle

(57) ABSTRACT

Stimuli-responsive highly absorbent superabsorbent polymers (SAPs) are used to harness water to augment water supply and solve water crisis. Rain water is harnessed in fabric-based sachets or bags partially filled with the polymers. The hydrated polymers are used to store water in warehouses for an extended period of time and the invention may obviate the need to construct controversial huge dams and canals or drill wells. The stored water in superabsorbent polymers is released at the point of use by any stimulus which may be light-induced, electrical, thermal or chemical treatment. SAPs with 2000 g/g of absorbency can yield 99.95% pure water in solid/gel form. An ultra SAP with absorbency of 10,000 g/g of the polymer could hold 10 billion cu.m. of water in one million tonnes of the polymer. This is more than the storage capacity of a typical large dam over a river.

7 Claims, No Drawings

BAGS PARTIALLY FILLED WITH STIMULI-RESPONSIVE HIGHLY ABSORBENT SUPERABSORBENT POLYMERS FOR WATER MANAGEMENT AND REPLACEMENT OF DAMS AND CANALS

CROSS-REFERENCE TO RELATED APPLICATIONS

Provisional patent application No. 61/403,737 dated Sep. 21, 2010

This is continuation-in-part for my application Ser. No. 13/231,664 filed Sep. 13, 2011, now pending.

BACKGROUND OF THE INVENTION

1. Field

This invention relates to use of stimuli-responsive highly superabsorbent polymers for harvesting, storage, transportation and retrieval of rain water to obviate the need for dams and canals.

2. Prior Art

Superabsorbent polymers (SAP) are polymers that can absorb and retain extremely large amounts of a liquid relative to its own mass. Lightly cross-linked sodium polyacrylate is the most common type of SAP made in the world today. Widely used in personal disposable hygiene products such as baby diapers, it can absorb about 800 times its weight of distilled water. Other SAP compositions include acrylamide copolymers, ethylene maleic anhydride copolymers, crosslinked carboxy-methyl-cellulose, polyvinyl alcohol copolymers, crosslinked polyethylene oxide and starch grafted copolymer of acrylonitrile.

One of the early patents, U.S. Pat. No. 3,669,103, describes compositions based on lightly cross-linked polymers, such as polyvinylpyrrolidones, sulfonated polystyrenes, sulfonated polyvinyltoluenes, poly-sulfoethyl acrylates, poly-2-hydroxyethyl acrylates, polyacrylates, hydrolyzed polyacrylamides and copolymers of acrylamide with acrylic acid for use in diapers.

U.S. Pat. No. 3,935,099 describes alkali saponified gelatinized-starch-polyacrylonitrile graft polymers used as absorbents for aqueous suspensions such as sewage sludges.

U.S. Pat. No. 4,286,082 discloses lightly cross-linked sodium polyacrylate SAP for use in baby diapers and sanitary napkins.

In U.S. Pat. No. 4,483,950, starch-based superabsorbents extended with modified starches were promoted as thickening agents.

U.S. Pat. No. 4,913,517 covers uses of SAPs as cable-sealing materials.

U.S. Pat. No. 5,241,009 describes polycarboxyl group containing superabsorbents wherein neutralization of said carboxyl groups with potassium or lithium is described as providing a polymeric composition specifically adapted to absorb proteinaceous fluids, such as blood.

U.S. Pat. No. 6,623,645 describes use of SAPS for wastewater containment and treatment. It does not use stimuli-responsive SAPS. The water collected is contaminated and cannot be used by humans for normal use. It is not a method to replace dams and canals. The dry contaminated polymer is discarded and cannot be reused.

U.S. Pat. No. 6,869,464 describes a device for collecting atmospheric water at humid locations. It does not teach about collection of water in bags, their storage in warehouses or distribution. It is not a method to replace dams and canals.

U.S. Pat. No. 6,800,712 discloses SAPS based on grafted starches for use in crop production.

In all above examples, SAPS generally absorb up to 1000 times their weight of water.

Global demand for SAPS is about 2 million metric tons annually. More than 90% is used in disposable hygiene products. Small amounts are used in agriculture, cable sealing and other niche applications.

Recent research has resulted in some highly absorbent SAPs. Deyu in his Ph.D. thesis "Superabsorbent Polymer Composite Materials and their Industrial and High-Tech Applications", 2003, at Technische Universitat, Bergakademie, Freiberg, Germany describes SAP composites with bentonite (clay) to have water absorbence in excess of over 2000 gram/gram of the composite.

Bowling Green State University in the US has reported water absorbance in the range of 2000 to 6000 grams/gram of SAP. The research is described in Thilini K. Mudiyanselage et al, Highly Absorbing Superabsorbent Polymer, Journal of Polymer Science: Part A: Polymer Chemistry, Vol. 46, 1357-1364 (2008). The same research team at the Bowling Green State University has also synthesized photochromic SAPs with water absorbance of 2800 g/g of SAP. When the hydrated photochromic SAP was irradiated with UV light, it expelled the water.

Hitherto, no one has proposed use of SAPs for harvesting and storage of rain water as replacement of dams and canals.

Advantages

Highly absorbent SAPs have now been developed with absorbency of more than 6000 times their weight of distilled water. With just 2000 g/g of absorbing capacity, we can have at least 99.95% pure water in solid/gel form. Water in solid form can be easily transported and stored anywhere without leakage or loss. The solid water may be stored in cheap plastic bags in warehouses for an extended period of time. The stored water in SAPs may be released at the point of use by any stimulus which may be chemical, light-induced, electrical, thermal treatment etc.

Accordingly, several advantages of one or more aspects of the invention are that looming worldwide water crisis can be solved with highly absorbent SAPs and water storage in SAPs in warehouses for an extended period of time may obviate the need to construct controversial huge dams and canals or drill wells. In arid lands, dew can be harvested and used to grow food to reduce hunger. Compared to 13,000 desalination plants worldwide, producing some 20 billion cu.m. of fresh water annually, equal amount of water can be obtained using only 200 plants each producing about 50,000 tonnes of SAP/year with 2000 g/g of absorbency.

Further advantages will become apparent from a consideration of the ensuing description.

SUMMARY

In accordance with the invention, one or more aspects of water harvesting with SAPs are disclosed. Highly absorbent SAPs which are stimuli-responsive are used to harvest rain water to augment water supply and solve water crisis. The SAPs may be recycled and rehydrated number of times. They may be an additional source for drinking water. The water is absorbed in fabric-based sachets or bags partially filled with the polymer. The hydrated SAPs in sachets/bags are used for storage of water in warehouses for an extended period of time and may obviate the need to construct controversial huge dams and canals or drill wells. The stored water in SAPs is released at the point of use by any stimulus which may be chemical, light-induced, electrical, thermal treatment etc. Examples of SAPs include sodium or potassium salts of crosslinked polyacrylic acid, salts of crosslinked acrylamide copolymers, starch-acrylonitrile copolymers, composites with clay, stimuli-responsive polymers etc. SAPs with absorbing power of at least 1000 times their own weight are preferred. With 2000 g/g of swelling capacity, we can have at least 99.95% pure water in solid/gel form.

DETAILED DESCRIPTION

SAPs are macromolecules that can absorb and retain extremely large amounts of a liquid relative to their mass. Lightly cross-linked sodium polyacrylate is the most common type of SAP made in the world today. Widely used in personal disposable hygiene products such as baby diapers, it can absorb up to about 800 times its weight of distilled water. Other SAP compositions include one derived from starch which is one of the oldest SAP developed.

No one has proposed for SAP's use for rain harvesting or water management to replace dams. With just 2000 g/g of absorbing capacity, we can have at least 99.95% pure water in solid/gel form. Water in solid form can be easily transported and stored anywhere without leakage or loss. The solid water may be stored in warehouses in cheap plastic bags for an extended period of time. Looming worldwide water crisis can be solved with highly absorbent SAPs. Water is oil of the future. Supplies of water are under enormous strain. About 75% of rainfall is lost due to runoff to sea. Rain harvesting with SAPs and storage can augment water supplies and relieve crisis.

Water in solid/gel form can be transported to any remote part of the world in low-cost packages or transportation modes such as boxes, gunny bags, carts, open trucks etc. Water stored in SAPs is released at the point of use by an appropriate stimulus which may be chemical, UV light, thermal treatment etc. The SAPs may be recycled and rehydrated number of times. They are used for storage of water in warehouses and may obviate the need to construct controversial huge dams and canals or drill wells. An ultra SAP with absorbing capacity of 10,000 gram of water per gram of the polymer could hold 10 billion cu.m. of water in 1 (one) million tonnes of the polymer. This is more than the storage capacity of a typical large dam project over a river.

A typical supply cycle proposed is as follows: 1) Produce stimuli-responsive SAPs at strategic locations 2) Distribute SAP granules to harvesting centers 3) Harvest rain in fabric-based bags partially filled with SAPs 4) Store hydrated SAPs in warehouses 5) Transport hydrated SAPs to locations of use or water-pumping stations 6) Release water with a stimulus 7) Recycle used polymer. Alternately, individual homes or buildings fitted with commercial rain harvesting systems can augment their water supplies with these bags containing SAPs.

SAPs can be made available in a variety of forms for harvesting purpose. These include granules, sheet-like structures, fibers and non-woven webs. Different types of techniques are described in literature for rain harvesting. These can be augmented with SAPs.

Rain water collected in catchment areas of rain harvesting systems such as tanks, paved or tiled fields etc are soaked into SAPs and hydrated SAPs stored. One example is use of sachets or bags made of a non-woven fabric for SAP granules. Sachets/bags of appropriate sizes partially filled with SAP granules are mechanically lowered or passed into rain catchment area. They are almost instantly hydrated with water and subsequently removed and stored. This whole operation can be mechanized.

Hydrated SAPs are stored in homes or warehouses. They may be transported to remote arid areas. At the point of use hydrated SAPs are given an appropriate stimulus depending on the polymer type and water released. In one experiment, 0.5 gram of lightly cross-inked sodium polyacrylate was placed in a 12"×12" sachet made of a non-woven fabric like one used for tea bags. The sachet was soaked in distilled water and it absorbed water instantly. Fully hydrated SAP weighed about 400 grams. About 2 c.c. of a saline solution was sprayed on the sachet. Most of the water was instantly released under slight hand pressure.

Dew can be a significant water source but it is lost via evaporation as soon as the sun comes up. In certain coastal arid regions of the world, dew occurs over a period of 8 months in a year. Dew water can be harvested using SAPs. In one method, granules of SAPs or sachets containing SAP are spread on a metal and/or plastic sheet, leaving them overnight and collecting hydrated SAP in the morning.

Accordingly, the reader will see that I have provided a solution to the looming worldwide water crisis by harvesting water in SAPs. With just 2000 g/g of absorbing capacity of a highly absorbent SAP, we can have at least 99.95% pure water in solid/gel form. Water in solid form can be easily transported and stored anywhere without leakage or loss. The solid water may be stored in cheap plastic bags for an extended period of time in warehouses. The stored water in SAPs may be released at the point of use by any stimulus which may be light-induced, electrical, thermal treatment, chemical treatment etc. Water storage in SAPs in warehouses may obviate the need to construct controversial huge dams and canals or drill wells. Starch-based highly absorbent SAP or a clay-composite may be made available at low cost for use of this invention. Compared to 13,000 desalination plants worldwide, producing some 20 billion cu.m. of fresh water annually, equal amount of water can be obtained using only 200 plants each producing about 50,000 tonnes of SAP/year with 2000 g/g of water absorbency.

While the above description contains some specific examples, these should not be construed as limitations on the scope of the invention. Many other ramifications and variations are possible within the teachings of the invention. For example, instead of SAP granules in a sachet or bag, SAP in the form of a sheet-like structure, fibers or fabric or the like may be used to harvest water. Instead of chemical stimulus shown in the above example, sun light or UV light may be used to release water from a hydrated photochromic SAP. Instead of water from rain or dew, SAPs may be used to harness water from flood.

Thus the scope of the invention should be determined by the appended claims and their legal equivalents, and not by the examples given.

What is claimed is:

1. A method of harvesting rain water, flood water, or dew with stimuli-responsive superabsorbent polymers (SAPs), comprising:
    (a) partially filling fabric-based bags or sachets with SAPs;
    (b) distributing the SAP filled fabric-based bags or sachets to a harvesting center;
    (c) contacting the SAP filled fabric-based bags or sachets with floodwater, rain or dew at the harvesting center;
    (d) harvesting rain or dew with the SAP filled fabric-based bags or sachets by absorbing water from the rain or dew to form hydrated SAP filled fabric-based bags or sachets;

(e) storing hydrated SAP filled fabric-based bags or sachets in bags in warehouses for a period of time;
(f) transporting hydrated SAP filled fabric-based bags or sachets in bags from warehouses to a point of use; and
(g) releasing water from hydrated SAP filled fabric-based bags or sachets with a stimulus.

2. The method of claim 1, wherein superabsorbent polymer is in the form of granules or powder placed in sealed fabric-based sachets or bags.

3. The method of claim 1, wherein the hydrated SAP filled fabric-based bags or sachets are be placed in protective plastic bags during transportation and storage to prevent water evaporation.

4. The method of claim 1, wherein water in hydrated superabsorbent polymers is released at point of use by a stimulus which is selected from the group consisting of chemical, thermal, electrical, and exposure to sun or UV light.

5. A method of claim 1, where the superabsorbent polymer is selected from the group consisting of sodium or potassium salts of crosslinked polyacrylic acid, salts of crosslinked acrylamide copolymers, starch-acrylonitrile copolymers, composites with clay, stimuli-responsive superabsorbent polymers.

6. The method of claim 1, wherein the superabsorbent polymers have a water retention of at least 1000 grams of water per gram of superabsorbent polymer.

7. The method of claim 1, wherein after the water is released from hydrated SAP, the water is consumed by humans.

* * * * *